United States Patent
Taruya et al.

(10) Patent No.: US 12,466,275 B2
(45) Date of Patent: Nov. 11, 2025

(54) POWER SYSTEM

(71) Applicant: HONDA MOTOR CO., LTD., Tokyo (JP)

(72) Inventors: Kenji Taruya, Saitama (JP); Daishi Igarashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1101 days.

(21) Appl. No.: 17/447,059

(22) Filed: Sep. 7, 2021

(65) Prior Publication Data

US 2022/0080841 A1    Mar. 17, 2022

(30) Foreign Application Priority Data

Sep. 11, 2020    (JP) ................................ 2020-152518

(51) Int. Cl.
| | |
|---|---|
| *B60L 50/71* | (2019.01) |
| *B60L 50/51* | (2019.01) |
| *H01M 8/043* | (2016.01) |
| *H01M 8/04746* | (2016.01) |
| *H01M 8/04858* | (2016.01) |
| *H01M 10/44* | (2006.01) |

(Continued)

(52) U.S. Cl.
CPC ............... *B60L 50/71* (2019.02); *B60L 50/51* (2019.02); *H01M 8/043* (2016.02); *H01M 8/04753* (2013.01); *H01M 8/0494* (2013.01); *H01M 8/04947* (2013.01); *H01M 10/44* (2013.01); *H01M 10/46* (2013.01); *H01M 16/006* (2013.01); *H01M 2220/20* (2013.01); *H01M 2250/20* (2013.01)

(58) Field of Classification Search
None
See application file for complete search history.

(56) References Cited

U.S. PATENT DOCUMENTS

2020/0251761 A1    8/2020    Kaneko et al.

FOREIGN PATENT DOCUMENTS

| JP | 2010146749 A |    | 7/2010 |
|---|---|---|---|
| JP | 2014154362 A | * | 8/2014 |

(Continued)

OTHER PUBLICATIONS

JP2014154362A English translation (Year: 2014).*
JP2017147140A English translation (Year: 2017).*

*Primary Examiner* — Ula C Ruddock
*Assistant Examiner* — Sarika Gupta
(74) *Attorney, Agent, or Firm* — CKC & Partners Co., LLC (57) ABSTRACT

The power system includes a fuel cell stack, a system accessory, a battery, and a control device. The control device executes, based on a state of a vehicle and the battery, one of the following processes: a normal power generation process during which the control device makes a net output greater than 0; a first idling stop process during which the control device makes the net output equal to or less than 0 while continuing operation of the system accessory and power generation by the stack; a second idling stop process during which the control device makes the net output less than 0 by stopping the power generation while continuing the operation of the system accessory; and a third idling atop process during which the control device makes the net output equal to 0, by stopping both the operation of the system accessory and the power generation.

10 Claims, 8 Drawing Sheets

(51) Int. Cl.
*H01M 10/46* (2006.01)
*H01M 16/00* (2006.01)

(56) References Cited

FOREIGN PATENT DOCUMENTS

| | | |
|---|---|---|
| JP | 2017147140 A | 8/2017 |
| JP | 2020087773 A | 6/2020 |
| JP | 2020123544 A | 8/2020 |

* cited by examiner

| | FIRST IDLING STOP PROCESS | SECOND IDLING STOP PROCESS | THIRD IDLING STOP PROCESS |
|---|---|---|---|
| POWER GENERATION BY FUEL CELL STACK | YES | NO | NO |
| OPERATION OF SYSTEM ACCESSORY | YES | YES | NO |
| ANTI-DETERIORATION PROCESS | NO | NO | YES |
| CONSUMPTION OF HYDROGEN | YES | NO | NO |
| CONSUMPTION OF HIGH VOLTAGE BATTERY'S POWER BY SYSTEM ACCESSORY | NO | YES | NO |
| EFFECT ON DETERIORATION OF FUEL CELL STACK | INTERMEDIATE | LARGE | SMALL |
| ENERGY EFFICIENCY | LOW | INTERMEDIATE | HIGH |
| TIME REQUIRED TO RESUME POWER GENERATION | — | SHORT | LONG |

POWER SYSTEM

This application is based on and claims the benefit of priority from Japanese Patent Application No. 2020-152518, filed on 11 Sep. 2020, the content of which is incorporated herein by reference.

BACKGROUND OF THE INVENTION

Field of the Invention

The present disclosure relates to a power system. More specifically, the present disclosure relates to a power system including a fuel cell system and a battery.

Related Art

A fuel cell vehicle is equipped with a power system including, for example, a fuel cell system for generating power by means of a fuel cell, a battery for storing power outputted from the fuel cell system, a traction motor causing the vehicle to travel by consuming power outputted from the fuel cell system and power outputted from the battery. The fuel cell system is composed of, for example, a fuel cell stack for generating power upon supply of hydrogen as a fuel gas and air as an oxidant gas, and a system accessory for supplying hydrogen and air to the fuel cell stack.

Meanwhile, when a small amount of power is required by vehicle loads, such as a traction motor and a vehicle accessory, and a battery is approximately fully charged, i.e., when none of the vehicle components can receive an output from a fuel cell system, it is necessary to reduce the output of the fuel cell system although the power system is in operation. However, if the power generation by the fuel cell stack is stopped each time the output of the fuel cell system needs to be reduced, it may take a certain time to restart the fuel cell stack thereafter, or deterioration of the fuel cell stack may be accelerated.

To address this problem, Patent Document 1 discloses a power system that is configured to cause a fuel cell stack to continue generating power under a very low load when the output of the fuel cell system needs to be reduced. More specifically, part of air supplied from an air pump included in system accessories is caused to bypass a cathode flow path of the fuel cell stack, so that the cathode flow path of the fuel cell stack is supplied with air at a low flow rate, and the air pump is continuously driven by power generated with air at the low flow rate. Thus, the power system disclosed in Patent Document 1 can reduce, without stopping the power generation by the fuel cell stack, a net output that is the electrical output from the entire fuel cell system composed of the fuel cell stack and the system accessories.
Patent Document 1: Japanese Unexamined Patent Application, Publication No. 2017-147140

SUMMARY OF THE INVENTION

However, even under a very low load, if power generation by the fuel cell stack is continued for a long time, hydrogen may be consumed unnecessarily. In addition, since air flows at a low flow rate through the cathode flow path under a very low load, there is room for improvement in terms of drainage of water produced due to the power generation and stability of the power generation by the fuel cell stack.

The present disclosure is intended to provide a power system capable of performing an idling stop process to make a net output of a fuel cell system equal to or less than 0 in a manner suitable for a state of the power system and a state of a battery.

(1) A power system according to an aspect of the present disclosure includes: a fuel cell stack that generates power by way of an electrochemical reaction between a fuel gas and an oxidant gas; a system accessory that supplies the fuel gas and the oxidant gas by consuming power; a battery that stores power outputted from the fuel cell stack; a load that consumes power outputted from the fuel cell stack or power outputted from the battery; and a control device that controls a fuel cell system including the fuel cell stack and the system accessory. The control device executes, based on a state of the power system and a state of the battery, one of the following processes; a normal power generation process during which the control device causes the fuel cell stack to generate power, and makes a net output greater than 0, the net output being output power of the fuel cell system; a first idling stop process during which the control device makes the net output equal to or less than 0 while continuing operation of the system accessory and power generation by the fuel cell stack; a second idling stop process during which the control device makes the net output less than 0 by stopping the power generation by the fuel cell stack while continuing the operation of the system accessory; and a third idling stop process during which the control device makes the net output equal to 0 by stopping both the operation of the system accessory and the power generation by the fuel cell stack.

(2) In this case, it is preferable that the system accessory includes an air pump, an oxidant gas supply path connecting the air pump to the fuel cell stack, and a bypass flow path branching off from the oxidant gas supply path, and that during the first idling stop process, the control device causes part of the oxidant gas supplied from the air pump to flow into the bypass flow path so that the part of the oxidant gas bypasses the fuel cell stack, and causes the fuel cell stack to continue generating power under a very low load.

(3) In this case, it is preferable that during the second idling stop process, the control device stops the power generation by the fuel cell stack by stopping at least, one of supply of the fuel gas to the fuel cell stack or supply of the oxidant gas to the fuel cell stack.

(4) In this case, it is preferable that during the third idling stop process, the control device executes an anti-deterioration process by filling an oxidant gas flow path of the fuel cell stack with an inert gas, and thereafter, stops the operation of the system accessory and the power generation by the fuel cell stack.

(5) In this case, it is preferable that the load Includes a traction motor for causing a vehicle to travel, and that the control device selectively executes one of the normal power generation process and the first to third idling stop processes, based on a state of the vehicle and a state of the battery.

(6) In this case, it is preferable that the control device executes the first idling stop process when a charge rate of the battery is equal to or higher than a predetermined value and the vehicle is at a temporary stop.

(7) In this case, it is preferable that the control device executes the second idling stop process when the charge rate of the battery is equal to or higher than the predetermined value and the vehicle is traveling downhill.

(8) In this case, it is preferable that the control device executes the third .idling stop process when the charge rate of the battery is equal to or higher than the predetermined value and the vehicle is at a standstill.

(9) In this case, it is preferable that the fuel cell system includes a plurality of fuel cell systems, and that the control device selects, from the plurality of fuel cell systems, an idling stop target the net output of which is to be made equal to or less than 0, based on a degree of deterioration of each of the plurality of fuel cell systems.

(10) In this case, it is preferable that when the first or second idling stop process is to be executed, the control device selects, as the idling stop target, one fuel system that has the lowest degree of deterioration from the plurality of fuel cell systems.

(11) In this case, it is preferable that when the third idling stop process is to be executed, the control device selects, as the idling stop target, one fuel system that has the highest degree of deterioration from the plurality of fuel cell systems.

(1) The control device executes one of the normal power generation process, the first idling stop process, the second idling stop process, and the third idling stop process, based on a state of the power system and a state of the battery. Here, a comparison is made between the three idling stop processes according to which the net output of the fuel cell system, which includes the fuel cell stack and its system accessory, is made equal, to or less than 0. The first idling stop process, during which the net output is made equal to or less than 0 while the operation of the system accessory and the power generation of the fuel cell stack are continued, has a lower energy efficiency than the second and third idling stop processes. On the other hand, it takes a shorter time to resume the power generation in the first idling stop process than in the second and third idling stop processes. The third idling stop process, during which the net output is made equal to 0 while the operation of the system accessory and the power generation by the fuel cell stack are both stopped, has a higher energy efficiency than the first and second idling stop processes. On the other hand, it takes a longer time to resume the power generation in the third idling stop process than in the first and second idling stop processes. The second idling stop process, during which the net output is made less than 0 by stopping the power generation by the fuel cell stack while the operation of the system accessory is continued, has a higher energy efficiency than the first idling stop process. It takes a shorter time to resume the power generation in the second idling stop process than in the third idling stop process. According to the present disclosure, the control device selectively executes the normal power generation process and the first to third idling stop processes described above, according to a state of the power system and a state of the battery. Consequently, one idling stop process suitable for the state of the power system and the state of the battery can be executed such that the energy efficiency and the restartability are not impaired.

(2) During the first idling stop process, the control device causes part of the oxidant gas supplied from the air pump to flow into the bypass flow path so that the part of the oxidant gas bypasses the fuel cell stack. In this way, the control device causes the fuel cell stack to continue generating power under a very low load. This feature renders it possible to make the net output equal to or less than 0 while continuing the operation of the system accessory and the power generation by the fuel cell stack.

(3) During the second idling stop process, the control device stops the power generation by the fuel cell stack by stopping at least one of supply of the fuel gas to the fuel cell stack or supply of the oxidant gas to the fuel cell stack. This feature makes it possible to cause the fuel cell stack to promptly resume the power generation upon request, although there is a risk of accelerating deterioration of the fuel cell stack in comparison with the third idling stop process.

(4) During the third idling stop process, the control, device executes the anti-deterioration process by filling the oxidant gas flow path of the fuel cell stack with an inert gas, and thereafter, stops the operation of the system accessory and the power generation by the fuel cell stack. This feature makes it possible to retard the deterioration of the fuel cell stack although it takes a longer time to resume the power generation by the fuel cell stack in comparison with the second idling stop process.

(5) According to the present disclosure, one of the normal power generation process and the first to third idling stop processes is selectively executed based on a state of the vehicle and a state of the battery. This feature makes it possible to execute one idling stop process suitable for the state of the vehicle and the state of the battery such that the energy efficiency and the restartability are not impaired.

(6) According to the present disclosure, the first idling stop process is executed when a charge rate of the battery is equal to or higher than the predetermined value and the vehicle is at a temporary stop. Due to this feature, when the vehicle resumes traveling, the output of the fuel cell system can be promptly increased in response to a request of a driver, while preventing overcharge of the battery.

(7) According to the present disclosure, the second idling stop process is executed when the charge rate of the battery is equal to or higher than the predetermined value and the vehicle is traveling downhill. Due to this feature, while the power generation by the fuel cell stack is stopped, the system accessory can be driven by means of regenerative power outputted from the traction motor. Thus, the present disclosure makes it possible to cover the power consumption of the system accessory with the regenerative power, while preventing overcharge of the battery.

(8) As described above, it takes a longer time to resume the power generation in the third idling stop process than in the first and second idling stop processes. To address this, according to the present disclosure, when the charge rate of the battery is equal to or higher than the predetermined value and the vehicle is at a standstill, that is, when it can be determined that the driver does not intend to immediately resume moving the vehicle, the third idling stop process is executed. This feature makes it possible to retard the deterioration of the fuel cell stack without impairing the restartability.

(9) According to the present disclosure, the idling stop target the net output of which is to be made equal to or less than 0 is selected from the plurality of fuel cell systems, based on the degree of deterioration of each of the plurality of fuel cell systems. This feature renders it possible to make the degrees of deterioration of the fuel cell systems approximately uniform.

(10) The first and second idling stop processes have more effect on the deterioration of the fuel cell system than the third idling stop process. In view of this, according to the present disclosure, when the first or second idling stop process is to be executed, one of the plurality of fuel cell systems that has the lowest degree of deterioration is selected as the idling stop target. This feature renders it possible to make the degrees of deterioration of the fuel cell systems approximately uniform.

(11) The third idling stop process has less effect on the deterioration of the fuel cell system than the first and second idling stop processes. In view of this, according to the present disclosure, when the third idling stop process is to be executed, one of the plurality of fuel cell systems that has the highest degree of deterioration is selected as the idling stop target. This feature renders it possible to make the degrees of deterioration of the fuel cell systems approximately uniform.

DETAILED DESCRIPTION OF THE INVENTION

First Embodiment

Figure 1:
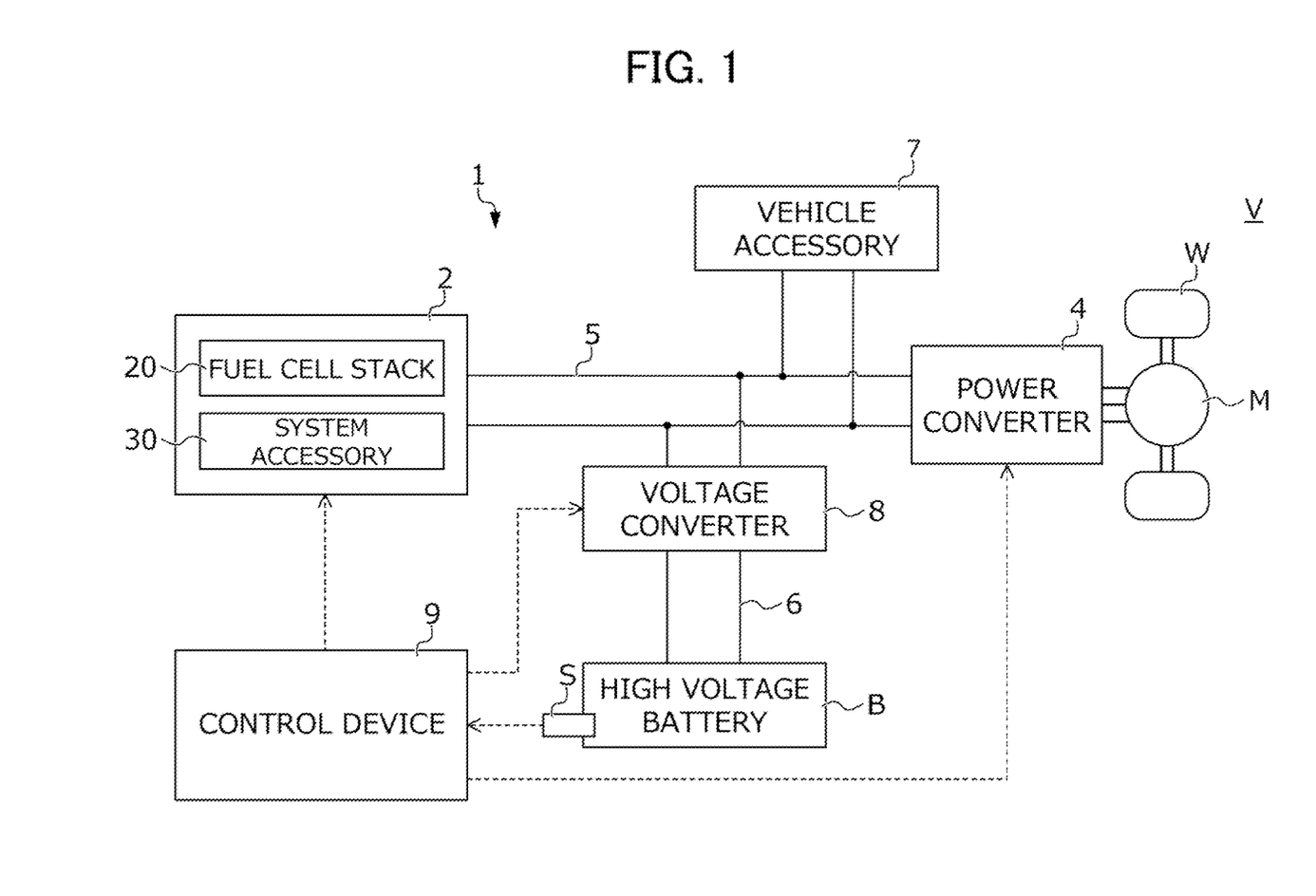
FIG. 1 is a diagram illustrating a configuration of a vehicle equipped with a power system according to a first embodiment of the present disclosure.

A power system according to a first embodiment of the present disclosure will be described with reference to the drawings. FIG. 1 is a diagram illustrating a configuration of a vehicle V equipped with the power system 1 according to the present embodiment.

The vehicle V includes driving wheels w and the power system 1 that allows exchange of power between a traction motor M connected to the driving wheels W, a fuel cell system 2 to be described later, and a high voltage battery B to be described later. The vehicle V is a so-called fuel cell vehicle that accelerates and decelerates using drive power produced by the traction motor M consuming electric power generated by the fuel cell system 2.

The power system 1 includes the traction motor M that causes the vehicle V to travel, a power converter A connected to the traction motor M, the fuel cell system 2 that generates power by means of a fuel cell stack 20, the high voltage battery B that stores power, a first power line 5 that connects the power converter 4 to the fuel cell system 2, a second power line 6 that connects the first power line b to the high voltage battery B, a vehicle accessory 7 connected to the first power line 5, a voltage converter 3 provided on the second power line 6, and a control device 9 that controls the fuel cell system 2, the power converter 4, and the voltage converter 3. In the power system 1, an electric load that consumes power outputted from the fuel, cell stack 20 or the high voltage battery B is mainly constituted by the traction motor M and the vehicle accessory 7.

The traction motor M is coupled to the driving wheels W via a power transmission mechanism (not shown). The traction motor M generates torque upon supply of three-phase AC power from the power converter 4, and the torque generated by the traction motor M is transmitted to the driving wheels W via the power transmission mechanism (not shown), and rotates the driving wheels W, thereby causing the vehicle V to travel. The traction motor M functions as a power generator when the vehicle V decelerates so as to generate regenerative power, while providing the driving wheels W with regenerative braking torque corresponding to the intensity of the regenerative power. The power system 1 is configured such that the regenerative power generated by the traction motor M can be charged to the high voltage battery B and can be consumed by the vehicle accessory 7 and the fuel cell system 2.

The high voltage battery B is a secondary battery that is capable of performing both discharge and charge by converting chemical energy to electric energy and by converting electric energy to chemical energy, respectively. In the following, a case will be described in which a so-called lithium-ion battery that performs charge and discharge by way of movement of lithium ions between electrodes is used as the high voltage battery B. However, this is a non-limiting example. The high voltage battery B is connected to the first power line 5 via the second power line 6 and the voltage converter 8.

The high voltage battery B is provided with a battery sensor unit S for estimating an internal state of the high voltage battery 33. The battery sensor unit S includes a plurality of sensors that detect a physical quantity necessary for the control device 9 to acquire a charge rate (reserves of power stored in the battery, and represented in terms of percentage) corresponding to remaining charge of the high voltage battery B, and that transmit a signal corresponding to the detected value to the control device 9. More specifically, the battery sensor unit S includes a voltage sensor that, detects a terminal voltage of the high voltage battery B, a current sensor that detects a current passing through the high voltage battery B, and a temperature sensor that detects a temperature of the high voltage battery B.

The power converter 4 converts power between the first power line 5 and the traction motor M. The power converter 4 is, for example, a PWM inverter performing pulse width modulation and including a bridge circuit formed by bridge-connecting a plurality of switching elements (e.g., IGBTs). The power converter 4 has a function of converting DC power to AC power and vice versa. The power converter 4 has a DC input/output end connected to the first power line 5, and an AC input/output end connected to coils of U-phase v-phase, and W-phase of the traction motor M. In response to a gate drive signal generated at a predetermined timing by a gate drive circuit (not shown) of the control device 9, the power converter 4 turns on or off the switching elements corresponding to the phases. In this way, the power converter 4 converts DC power in the first power line 5 to three-phase AC power and supplies it to the traction motor M, or converts three-phase AC power supplied from the traction motor M to DC power and supplies it to the first, power line 5.

The voltage converter 8 connects the first power line 5 to the second power line 6, and converts a voltage between the two power lines 5 and 6. As the voltage converter 8, for example, a known boost chopper type DC-DC converter is used. In response to a command from the control device 9, the voltage converter 8 increases a voltage of power outputted from the high voltage battery B to the second power line 6 and supplies the power to the first power line 5, or reduces a voltage of power outputted from the fuel cell system 2 or the power converter 4 to the first power line 5 and supplies the power to the second power line 6 so that the high voltage battery B is charged with the power.

The fuel cell system 2 includes the fuel cell stack 20 that generates power by way of an electrochemical reaction between hydrogen as a fuel gas and air as an oxidant gas, and a system accessory 30 that supplies hydrogen and air to the fuel cell stack 20 and other components by consuming power. The fuel cell system 2 outputs the power generated by means of the fuel cell stack 20 to the first power line 5. The system accessory 30 operates by consuming power in the first power line 5 or power, generated by the fuel cell stack 20. The configuration of the fuel cell system 2 will be described later in more detail with reference to FIG. 2.

The vehicle accessory 7 includes a plurality of electric loads, such as an air conditioner and a battery heater. The vehicle accessory 7 is connected to, for example, the first power line 5, and operates by consuming power in the first power line 5. In the present embodiment, a case in which the vehicle accessory 7 is connected to the first power line 5 will be described. However, the component to which the vehicle accessory 7 is connected is not limited to the first power line 5. The vehicle accessory 7 may be connected to, for example, the second power line 6.

The control device S controls a power generation state of the fuel cell stack 20 by operating the system accessory 30 of the fuel cell system 2. The control device 9 also controls a net output that is an electrical output from the fuel cell system 2 to the first power line 5, and a battery output that is an electrical output from the high voltage battery B to the first power line 5, by operating the power converter 4 and the voltage converter 8. In this way, the power required by the vehicle accessory 7 and the traction motor M is supplied from the fuel cell system 2 and the high voltage battery B to the first power line 5.

As will be described later in detail with reference to FIG. 3, the control device 9 selectively performs one of a normal power generation process and idling stop processes, based on a state of the power system 1 and a state of the high voltage battery B. During the normal power generation process, power required by the traction motor M and the vehicle accessory 7 is supplied to the first power line 5 by causing the fuel cell stack 20 to generate power and making the net output greater than 0. During the idling stop processes, the net output is made equal to or less than 0.

Figure 2:
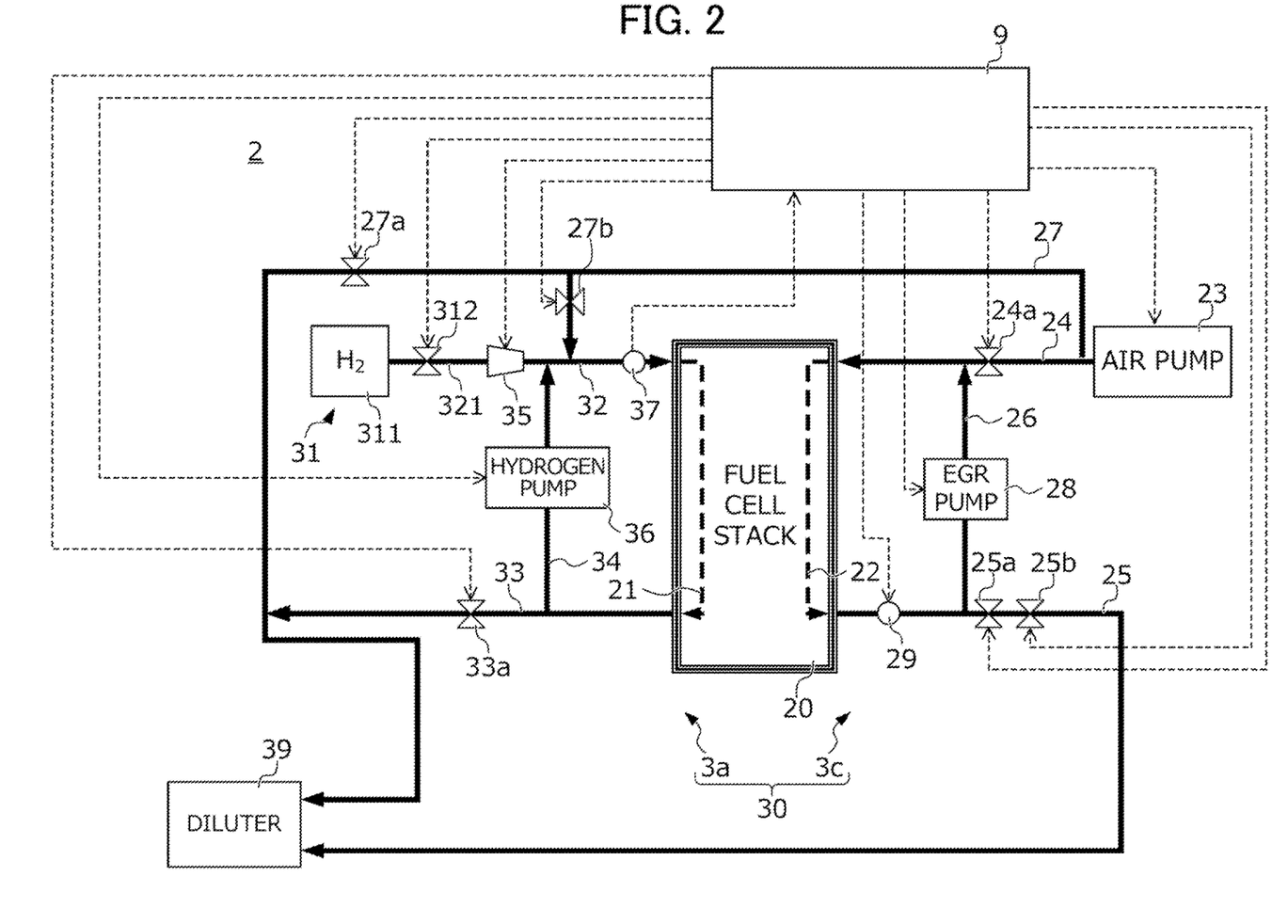
FIG. 2 is a diagram illustrating a configuration of a gas system of a fuel cell system.

FIG. 2 is a diagram illustrating a configuration of a gas system of the fuel cell system 2. The fuel cell system 2 includes the fuel cell stack 20, the system accessory 30 that supplies hydrogen and air to the fuel cell stack 20, and a diluter 39 that performs a post-treatment on a gas discharged from the fuel cell stack 20.

The fuel cell stack 20 is, for example, a stacked structure including tens to hundreds of fuel cells stacked together. Each fuel cell includes a membrane electrode assembly (MEA) sandwiched between a pair of separators. The membrane electrode assembly includes two electrodes, namely, an anode electrode (negative electrode) and a cathode electrode (positive electrode), and a solid polymer electrolyte membrane sandwiched between these electrodes. Usually, both electrodes are constituted by a catalyst layer that, is in contact with the solid polymer electrolyte membrane and causes an oxidation reaction and a reduction reaction, and a gas diffusion layer that is in contact with the catalyst layer. In the fuel cell stack 20, when an anode flow path 21 formed adjacent to the anode electrode is supplied with hydrogen and a cathode flow path 22 formed adjacent to the cathode electrode is supplied with air containing oxygen, an electrochemical reaction is caused between the hydrogen and air, whereby electric power is generated.

The system accessory 30 is dividable into an anode system 3a associated with supply of hydrogen and a cathode system 3c associated with supply of air.

The anode system 3a includes a hydrogen tank 31, a hydrogen supply pipe 32 extending from the hydrogen tank 31 to an introduction portion of the anode flow path 21, a hydrogen discharge pipe 33 extending from a discharge portion of the anode flow path 21 to the diluter 39, and a hydrogen reflux pipe 34 branching off from the hydrogen discharge pipe 33 and extending to the hydrogen supply pipe 32. The hydrogen supply pipe 32, the anode flow path 21, the hydrogen discharge pipe 33, and the hydrogen reflux pipe 34 together form a hydrogen circulation path for a hydrogen-containing gas.

The hydrogen tank 31 includes a tank body 311 that stores hydrogen gas at a high pressure, and a main stop valve 312 provided on the hydrogen supply pipe 32 extending from the tank body 311. The main stop valve 312 opens and closes in response to a command from the control device 9.

The hydrogen supply pipe 32 is provided with an injector 35 and an anode pressure sensor 37 in a portion downstream of the main stop valve 312. The injector 35 injects a fresh hydrogen gas supplied from the hydrogen tank 31 toward the fuel cell stack 20. The injector 35 opens and closes in response to a command from the control device 9. The anode pressure sensor 37 detects a pressure (hereinafter, referred to as "anode pressure") in the anode flow path 21 of the fuel cell stack 20, and transmits a signal corresponding to the detected value to the control device 9.

In the following, a section of the hydrogen supply pipe 32 between the injector 35 and the main stop valve 312 is referred to as an intermediate-pressure section 321. During power generation, the anode pressure of the fuel cell stack 20 is controlled and adjusted to a predetermined target pressure by way of opening or closing the injector 35 in a state where a pressure in the intermediate-pressure section 321 is sufficiently high. While a sufficient amount, of hydrogen gas remains in the intermediate-pressure section 321 even after closure of the main stop valve 312, the anode pressure can be controlled by opening or closing the injector 35 by the control device 9.

The hydrogen reflux pipe 34 is provided with a hydrogen pump 36 that pumps a gas present near the hydrogen discharge pipe 33 to the hydrogen supply pipe 32, and circulates the hydrogen-containing gas through the hydrogen circulation path. The hydrogen pump 36 operates in response to a command from the control device 9. The hydrogen discharge pipe 33 is provided with a purge valve 33a at a location downstream of a portion connected to the hydrogen reflux pipe 34. The purge valve 33a opens and closes in response to a command from the control device 9. When a hydrogen concentration decreases in the gas circulating through the hydrogen circulation path, power generation efficiency of the fuel cell stack 20 decreases. Therefore, the purge valve 33a is opened at an appropriate timing while the fuel cell stack 20 is generating power. In this way, the gas in the hydrogen circulation path is discharged into the diluter 39.

The cathode system 3c includes an air pump 23, an air supply pipe 24 connecting the air pump 23 to an introduction portion of the cathode flow path 22, an air discharge pipe 25 extending from a discharge portion of the cathode flow path 22 to the diluter 39, an air reflux pipe 26 branching off from the air discharge pipe 25 and extending to the air supply pipe 24, and a stack bypass pipe 27 branching off from the air supply pipe 24 and extending to the hydrogen supply pipe 32 and the diluter 39. The air supply pipe 24, the cathode flow path 22, the air discharge pipe 25, and the air reflux pipe 26 together form an oxygen circulation path for an oxygen-containing gas.

The air pump 23 supplies air outside the system to the cathode flow path 22 of the fuel cell stack 20 via the air supply pipe 24. The air pump 23 operates in response to a command from the control device 9. The air discharge pipe 25 is provided with a back pressure valve 25b for adjusting a pressure in the cathode flow path 22, and a cathode pressure sensor 2S. The back pressure valve 25b opens and closes in response to a command from, the control device 9. The cathode pressure sensor 29 detects a pressure (hereinafter, referred to as "cathode pressure") in the cathode flow path 22 of the fuel cell stack 20, and transmits a signal corresponding to the detected value to the control device 9. During power generation, the cathode pressure of the fuel cell stack 20 is controlled and adjusted to an appropriate pressure according to a power generation state of the fuel cell stack 20, by way of adjustment of a degree of opening of the back pressure valve 25b while the air pump 23 is supplying air.

The air reflux pipe 26 is provided with an EGR pump 28 that pumps a gas present near the air discharge pipe 25 to the air supply pipe 24, and circulates the oxygen-containing gas through the oxygen circulation path. The EGR pump 28 operates in response to a command from the control device 9. The air supply pipe 24 is provided with an inlet: closing valve 24a at a location toward the air pump 23 with respect to a portion connected to the air reflux pipe 26. The inlet closing valve 24a prevents outside air from flowing from the air pump 23 toward the cathode flow path 22 when the fuel cell system 2 is not in operation. Further, the air discharge pipe 25 is provided with an outlet closing valve 25a at a location toward the diluter 39 with respect to a portion where the air reflux pipe 26 branches off. The outlet closing valve 25a prevents outside air from flowing from the diluter 39 toward the cathode flow path 22 when the fuel cell system 2 is not in operation. The closing valves 24a and 25a each opens and closes in response to a command from the control device 9. During an anti-deterioration process to be described later (see FIG. 4 to be described later), the closing valves 24a and 25a are closed in a state in which the cathode flow path 22 is filled with an inert gas having a low oxygen concentration, thereby retarding deterioration of the fuel cell stack 20.

The stack bypass pipe 27 is provided with a bypass valve 27a for controlling a flow rate of air flowing from the air pump 23 to the diluter 39, and a scavenging valve 27b for controlling a flow rate of air flowing from the air pump 23 to the hydrogen supply pipe 32. The bypass valve 27a and the scavenging valve 27b each open and close in response to a command from the control device 9. For example, when the back pressure valve 25b is closed to prevent a dilution gas from being supplied from the air exhaust pipe 25 to the diluter 39, the bypass valve 27a is opened so that air present immediately downstream of the air pump 23 is supplied to the diluter 39. The scavenging valve 27b is opened to perform a scavenging process according to which impurities remaining in the hydrogen circulation path are discharged by means of air supplied from the air pump 23, while the power generation by the fuel cell stack 20 is stopped. In the present embodiment, a case is described in which the stack bypass pipe 27 is connected to the hydrogen supply pipe 32 with a pipe provided with the scavenging valve 27b. However, this is a non-limiting example. These pipes and the scavenging valve 27b do not necessarily have to be provided.

The diluter 39 dilutes the hydrogen-containing gas discharged through the purge valve 33a, using a gas introduced through the above-described back pressure valve 25b and bypass valve 27a as a diluent gas, and discharges the diluted gas out of the system.

Figure 3:
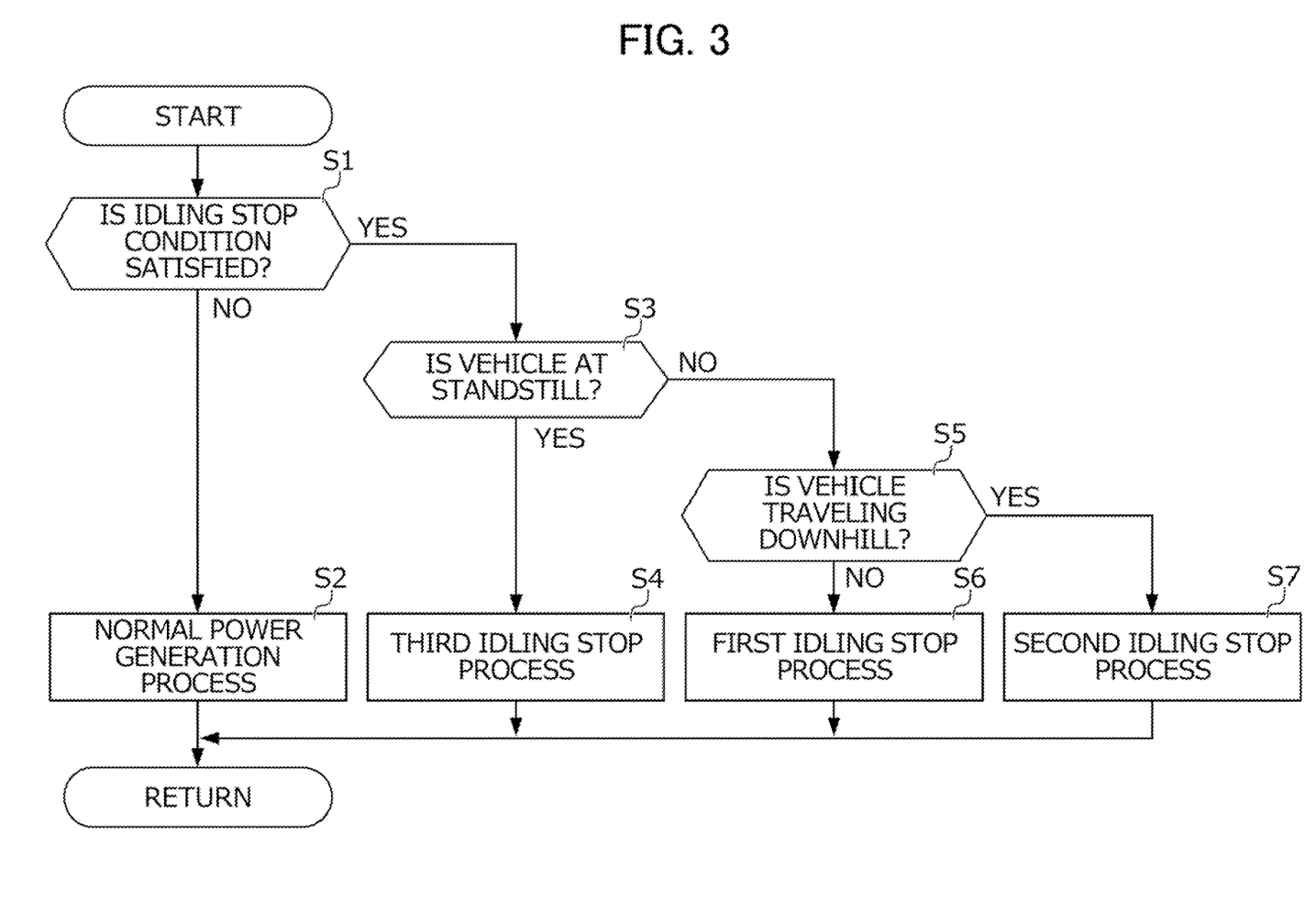
FIG. 3 is a flowchart illustrating a procedure according to which a control device selectively executes one of a normal power generation process and idling stop processes, based on a state of a vehicle and a state of a high voltage battery.

FIG. 3 is a flowchart illustrating a procedure according to which the control, device 9 selectively executes one of the normal power generation process and the idling stop processes, based on a state of the vehicle V and a state of the high voltage battery B. The processes illustrated in FIG. 3 are repeatedly executed in a predetermined cycle by the control device 9.

As illustrated in FIG. 3, the control device 9 is capable of executing a first idling stop process, a second idling stop process, and a third idling stop process as the idling stop processes for making the net output, of the fuel cell system 2 equal to or less than 0.

During the first idling stop process, the control device 9 controls and makes the net output equal to or less than 0 while continuing the operation of the system accessory 30 and the power generation by the fuel cell stack 20. That is, during the first idling stop process, the control device 9 operates the system accessory 30 by allowing it to consume ail of the power generated by the fuel cell stack 20, thereby making the net output equal to or less than 0.

More specifically, during the first idling stop process, the control device 9 drives the injector 35 to supply hydrogen to the anode flow path 21 of the fuel cell stack 20, in the anode system 3a. In the cathode system 3c, while driving the air pump 23 and supplying air to the air supply pipe 24, the control device 9 opens the bypass valve 27a to cause part of air supplied to the air supply pipe 24 from the air pump 23 to flow into the stack bypass pipe 21, so that, the part of air bypasses the cathode flow path 22 of the fuel cell stack 20. In other words, a flow rate of air in the cathode flow path 22 is reduced to become lower in the first idling stop process than in the normal power generation process, so that the fuel cell stack 20 continues generating power under a very low load. Here, power required to continue the operation of the system accessory 30 (in particular, the air pump 23) is covered by power generated by the fuel cell stack 20 under the very low load. That is, during the first idling stop process, the net output is made equal to or less than 0 by causing the fuel cell stack 20 to generate power equal to or less than power consumption of the system accessory 30. A shortage that can be caused in the case where the power generated by the fuel cell stack 20 is less than the power consumption of the system accessory 30 is covered by regenerative power supplied from the retraction motor M to the first power line 5, or power supplied from the high voltage battery E to the first power line 5.

While the first idling stop process is being executed, a situation may occur in which power generated by the fuel cell stack 20 temporarily becomes greater than the power consumption of the system accessory 30 for some reason, and the net output temporarily becomes greater than 0. In such a situation, an excess that cannot be consumed by the system accessory 30 may be temporarily stored in the high voltage battery B. Thereafter, when power generated by the fuel cell stack 20 becomes less than the power consumption of the system accessory 30, the shortage in the system accessory 30 may be covered by power supplied from the high voltage battery B.

Note that for the fuel cell stack 20, a minimum power output may be set as a lower limit of an output which can be produced by continuous power generation. Further, depending on a power generation environment of the fuel cell stack 20, the minimum power output may exceed the power consumption of the system accessory 30. In such a case, since it is impossible to continuously maintain the net output equal to or less than 0, the control device 9 may perform the second idling stop process to be described below, without executing the first idling stop process. Thus, the power generation by the fuel cell stack 20 may be stopped, and the system accessory 30 may continue operating by consuming power supplied from, for example, the high voltage battery B.

During the second idling stop process, the control device 9 stops the power generation by the fuel cell stack 20 while continuing the operation of the system accessory 30, and controls the net output to make it less than 0. Specifically, during the second idling stop process, the control device 9 continues driving the air pump 23 of the system accessory 30, and temporarily stops the power generation by the fuel cell stack 20 by stopping at least one of the supply of hydrogen to the anode flow path 21 of the fuel cell stack 20 or the supply of air to the cathode flow path 22 of the fuel cell stack 20. Here, the supply of hydrogen to the anode flow path 21 can be stopped by, for example, stopping driving the injector 35 and further closing the purge valve 33*a*. In the cathode system 3*c*, for example, the supply of air to the cathode flow path 22 can be stopped while the air pump 23 is being driven by such a way that the air pump 23 is continuously driven in a state where the inlet closing valve 24*a* and the outlet closing valve 25*a* are closed whereas the bypass valve 27*a* is open. Here, power required to operate the system accessory 30 (in particular, the air pump 23) is covered by regenerative power supplied from the traction motor M to the first power line 5 or power supplied from the high voltage battery B to the first power line 5. That is, during the second idling stop process, the net output is made less than 0 by continuously driving the system accessory 30 while the power generation by the fuel cell stack 20 is stopped.

During the third idling stop process, the control device 9 stops both the operation of the system accessory 30 and the power generation by the fuel cell stack 20, and controls the net output to make it equal to 0. More specifically, during the third idling stop process, the control device S executes the anti-deterioration process for retarding the deterioration of the fuel cell, stack 20 by filling the cathode flow path 22 of the fuel cell stack 20 with an inert gas, and thereafter, stops both the operation of the system accessory 30 and the power generation by the fuel cell stack 20.

Figure 4:
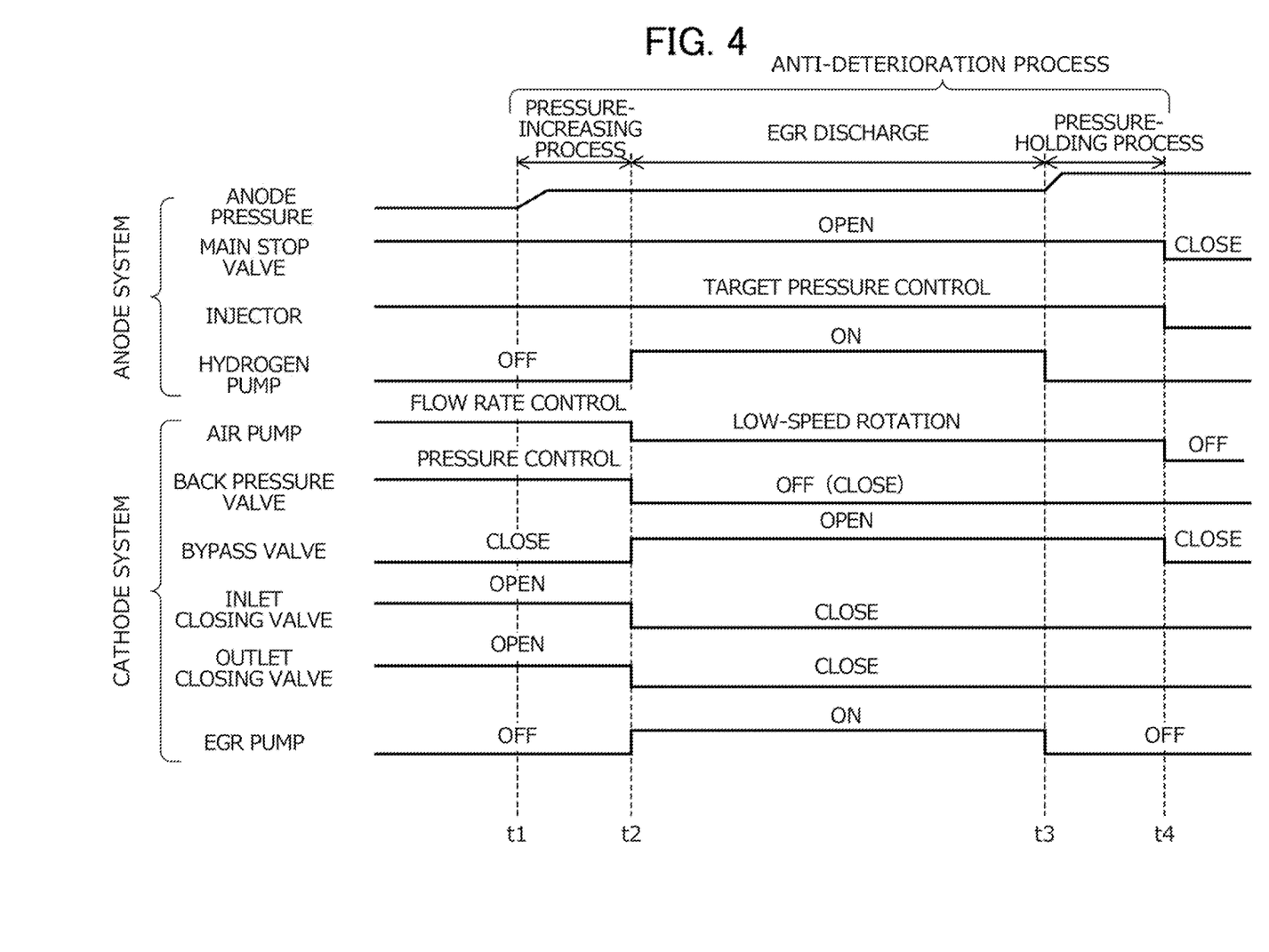
FIG. 4 is a time chart illustrating control procedures according to which respective devices are controlled during an anti-deterioration process.

FIG. 4 is a time chart Illustrating control procedures according to which the respective devices are controlled during the anti-deterioration process. The anti-deterioration process is a process for retarding the deterioration of the fuel cell stack 20, and includes three processes: a pressure-increasing process (t1 to t2), an EGR discharge process (t2 to t3), and a pressure-holding process (t3 to t4).

The pressure-increasing process precedes the EGR discharge process, and is performed to increase the anode pressure to a preferred pressure in advance. More specifically, during the pressure-increasing process, while ensuring a sufficient pressure in the intermediate-pressure section 321 by opening the main stop valve 312, the control device 9 feedback-controls the injector 35 based on an output of the anode pressure sensor 37 such that the anode pressure becomes equal to a target pressure to be described later.

During the EGR discharge process, oxygen remaining in the cathode flow path 22 is consumed before the power generation by the fuel cell stack 20 is completely stopped in order to prevent or retard the deterioration of the fuel cell stack 20. With respect to the devices of the anode system 3*a*, the control device 9 controls the anode pressure to make it equal to the predetermined target, pressure (hereinafter, referred to as "discharge target pressure") by means of the injector 35 in a state where the main stop valve 312 is open, and circulates the hydrogen gas through the hydrogen circulation path by means of the hydrogen pump 36. With respect to the devices of the cathode system 3*c*, the control device 9 maintains the cathode pressure at a predetermined target pressure by driving the air pump 23 in a state where the inlet closing valve 24*a* and the outlet closing valve 25*a* are closed. Further, the control device 9 circulates the gas through the oxygen circulation path by driving the EGR pump 23, thereby gradually reducing an oxygen concentration in the oxygen circulation path. During the EGR discharge process, the power generation by the fuel cell stack 20 and the discharge are performed for a predetermined period of time while the hydrogen circulation path and the oxygen circulation path are maintained in the above-described states, whereby the oxygen concentration is reduced in the oxygen circulation path. The EGR discharge process is performed until the oxygen concentration in the oxygen circulation path decreases to a predetermined concentration, or until a lapse of a certain time based on which it can be determined that the oxygen concentration has decreased to the predetermined concentration.

The pressure-holding process is a process for further increasing the anode pressure after the completion of the EGR discharge process. More specifically, during the pressure-holding process, the anode pressure is increased to a predetermined target pressure of the pressure-holding process that is higher than the above-mentioned target pressure of the discharge, by means of the injector 35 in a state where the main stop valve 312 is open. Note that at this time, the air pump 23 is preferably turned OFF in conjunction with the injector 35 (see time t4 in FIG. 4).

The anti-deterioration process is performed according to the above-described procedure, so that the cathode flow path 22 of the fuel cell stack 20 is filled with an inert gas having a low oxygen concentration while the anode flow path 21 is maintained at a high pressure by hydrogen gas. As a result, permeation of residual oxygen from the cathode side is minimized, whereby the deterioration of the fuel cell stack 20 can be retarded.

Figure 5:
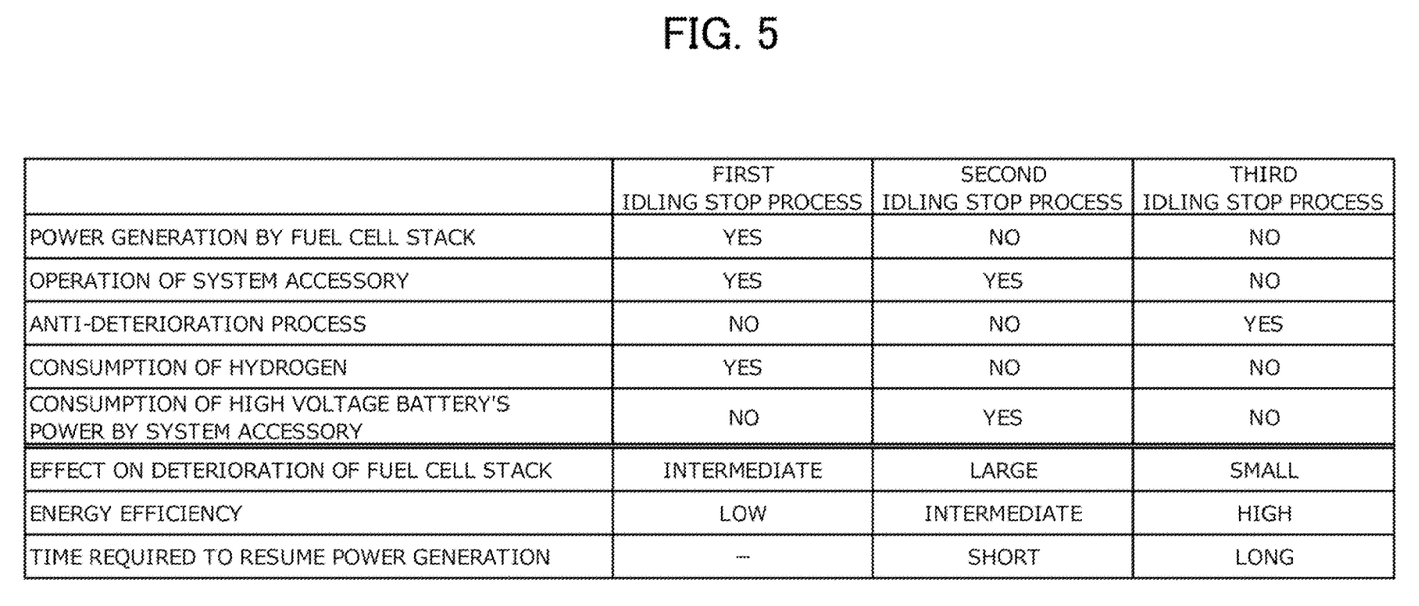
FIG. 5 is a table of comparison between effects of first to third idling stop processes.

FIG. 5 is a table of comparison between the effects of the first to third idling stop processes. The effect on the deterioration of the fuel cell stack 20 strengthens in the order of the third idling stop process, the first idling stop process, and the second idling stop process. That is, the third idling stop process, during which the power generation of the fuel cell stack 20 is stopped after the anti-deterioration deterioration process is performed as described above, has the smallest effect on the deterioration of the fuel cell stack 20. The second idling stop process, during which the power generation by the fuel cell stack 20 is stopped without the anti-deterioration process, has the largest effect, on the deterioration of the fuel cell stack 20.

Energy efficiency of the entire power system 1 increases in the order of the first idling stop process, the second idling stop process, and the third idling stop process. The first idling stop process, during which the power generation by the fuel cell stack 20 is continued while the system accessory 30 continuously operates, has the lowest energy efficiency. The third idling stop process, during which the operation of the system accessory 30 and the power generation by the fuel cell stack 20 are both stopped, has the highest energy efficiency.

It takes a shorter time to cause the fuel cell stack 20 to resume power generation in the second idling stop process than in the third idling stop process. The third idling stop process, during which the anti-deterioration process is performed and the cathode flow path 22 is filled with the inert gas as described above, requires a longer time to resume the power generation by the fuel cell stack 20 than the second idling stop process.

Reference is made to FIG. 3 again. In S1, the control device 9 determines whether a predetermined idling stop condition is satisfied. Here, the idling stop condition is a condition for stopping the normal power generation process and starting the first to third idling stop processes. In the following, a case will be described in which the idling stop condition is defined as that a charge rate of the high voltage battery B is equal to or higher than a predetermined upper limit and a required value in relation to the net output is equal to or less than 0, the required value being calculated according to a process (not shown). Here, the case where the required value with respect to the net output is 0 or less corresponds to, for example, a case where the vehicle v is at a standstill or a case where the vehicle V is traveling downhill.

If the determination in S1 is NO, the control device 9 executes the normal power generation process (see S2) and ends the process shown in FIG. 3.

If the determination in S1 is YES, the control device 9 proceeds to S3. In S3, the control device 9 determines whether the vehicle V is at a standstill. Here, it is possible to determine whether the vehicle V is at a standstill, based on, for example, whether a shift position of the vehicle V is at a parking position, whether a vehicle speed is 0 km/h and the parking brake is in operation, or whether the vehicle speed is 0 km/h and a current position of the vehicle V acquired from a navigation system is a parking lot. If the determination in S3 is YES, that is, if it can be determined that the driver does not intend to immediately resume moving the vehicle V, the control device 9 executes the third idling stop process (see S4), and ends the process shown in FIG. 3.

If the determination in S3 is NO, the control device 9 proceeds to S5. In S5, the control device 9 determines whether the vehicle V is traveling downhill. If the determination in S5 is NO, more specifically, if the vehicle V is, for example, at a temporary stop, the control device 9 executes the first idling stop process (see S6), and ends the process shown in FIG. 3.

If the determination in S5 is YES, that is, if the vehicle V is traveling downhill, the control device 9 executes the second idling stop process (see 37), and ends the process shown in FIG. 3.

Figure 6:
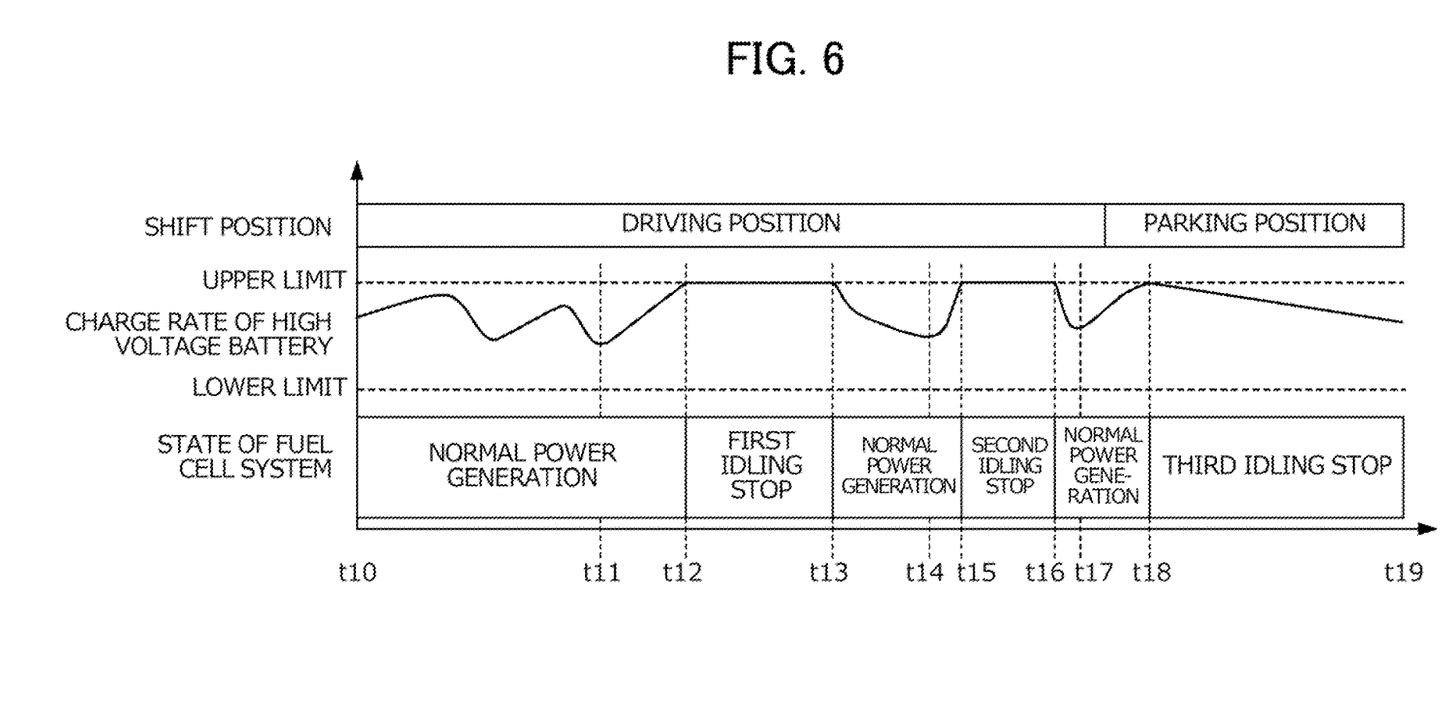
FIG. 6 is a time chart illustrating an example of a manner in which the normal power generation process and the idling stop processes are executed.

FIG. 6 is a time chart illustrating an example of a manner in which the normal power generation process and the idling stop processes are executed. FIG. 6 illustrates, as an example, a case where the driver sets the shift position at the drive position during a period from time t10 to time t17, and at the parking position during a period from time t17 to time t19. In the example of FIG. 6, the driver temporarily stops the vehicle V to wait for traffic lights to change during a period from time t11 to time t13, travels downhill during a period from time t14 to time t16, and keeps the air conditioner of the vehicle accessory 7 turned on while maintaining the shift position at the parking position during a period from time t17 to time t19.

First, during the period from time t10 to time t11, the control device 9 executes the normal power generation process and supplies power to the vehicle accessory 7 and the traction motor M in cooperation with the high voltage battery B. Thereafter, since the vehicle V comes to wait for the traffic light to change at time t11, a charge rate of the high voltage battery B is increased due to power outputted from the fuel cell system 2.

Thereafter, at time t12, in response to the charge rate of the high voltage battery B reaching the upper limit, the control device 9 starts the first idling stop process. During the first idling stop process, since the power generated by the fuel cell stack 20 under a very low load is consumed by the system accessory 30, the net output is equal to 0 and the charge rate of the high voltage battery B substantially constantly remains at the upper limit.

Thereafter, at time t13, in response to the driver resuming moving the vehicle V, the charge rate of the high voltage battery B begins to decrease from the upper limit. Upon this decrease in the charge rate, the control device 9 ends the first idling stop process, and starts the normal power generation process.

Thereafter, at time t14 when the vehicle V starts traveling downhill, the control device 9 starts charging the high voltage battery B with regenerative power generated by the traction motor M, whereby the charge rate begins to increase.

Thereafter, at time t15, in response to the charge rate of the high voltage battery B reaching the upper limit, the control device 9 starts the second idling stop process. While executing the second idling stop process, the control device 9 stops the power generation by the fuel cell stack 20, and causes the system accessory 30 to continue operating by consuming the regenerative power generated by the traction motor M.

Thereafter, at time t16 when the vehicle V finishes traveling downhill, in response to the charge rate of the high voltage battery 8 beginning to decrease from the upper limit, the control device 9 ends the second idling stop process, and starts the normal power generation process. At this time, since the power generation by the fuel cell stack 20 is temporarily stopped while the system accessory 30 continues operating during the second idling stop process, at time t16, the power generation by the fuel cell stack 20 can be promptly resumed, whereby transition to the normal power generation process can be implemented.

Thereafter, at time t17, the driver brings the vehicle V to a standstill, and sets the shift position at the parking position. Consequently, the charge rate of the high voltage battery B increases due to power outputted from the fuel cell system 2.

Thereafter, at time t18, in response to the charge rate of the high voltage battery B reaching the upper limit in a state where the shift, position is at the parking position, the control device 9 ends the normal power generation process and starts the third idling stop process. During the third idling stop process, after execution of the anti-deterioration process, the operation of the system accessory 30 and the power generation by the fuel cell stack 20 are stopped. Accordingly, following time t18, since the vehicle accessory 7 operates by consuming power supplied from the high voltage battery B, the charge rate of the high voltage battery B gradually decreases.

The power system 1 according to the present embodiment provides the following advantages.

(1) The control device 9 selectively executes one of the normal power generation process, the first idling stop process, the second idling stop process, and the third idling stop process, based on a state of the vehicle V and a state of the high voltage battery B. Here, a comparison is made between the three idling stop processes according to which the net output of the fuel cell system, which includes the fuel cell stack 20 and its system accessory 30, is made equal to or less than 0. The first idling stop process, during which the net output is made equal to or less than 0 while the operation of the system accessory 30 and the power generation of the fuel cell stack 20 are continued, has a lower energy efficiency of the entire power system 1 than the second and third idling stop processes. On the other hand, it takes a shorter time to resume the power generation in the first idling stop process than in the second and third idling stop processes. The third idling stop process, during which the net output is made equal to 0 while the operation of the system accessory 30 and the power generation by the fuel cell stack 20 are both stopped, has a higher energy efficiency than the first and second idling stop processes. On the other hand, it takes a longer time to resume the power generation in the third idling stop process than in the first and second idling stop processes. The second idling stop process, during which the net output is made less than 0 by stopping the power generation by the fuel cell stack 20 while the operation of the system accessory 30 is continued, has a higher energy efficiency than the first idling stop process. It takes a shorter time to resume the power generation in the second idling stop process than in the third idling stop process. In the present embodiment, the control device 9 selectively executes the normal power generation process and the first to third idling stop processes described above, according to a state of the vehicle V and a state of the high voltage battery B. Consequently, one idling stop process suitable for the state of the vehicle V and the state of the high voltage battery B can be executed such that the energy efficiency and the restartability are not impaired.

(2) During the first idling stop process, the control device 9 causes part of air supplied from the air pump 23 to flow into the stack bypass pipe 27 so that the part, of air bypasses the fuel cell stack 20. In this way, the control device 9 causes the fuel cell stack 20 to continue generating power under a very low load. This feature renders it possible to make the net output equal to or less than 0 while continuing the operation of the system accessory 30 and the power generation by the fuel cell stack 20.

(3) During the second idling stop process, the control device 9 stops the power generation by the fuel cell stack 20 by stopping at least one of supply of hydrogen to the fuel cell stack 20 or supply of air to the fuel cell stack 20. This feature makes it possible to cause the fuel cell stack 20 to promptly resume the power generation upon request, although there is a risk of accelerating the deterioration of the fuel cell stack 20 in comparison with the third idling stop process.

(4) During the third idling stop process, the control device 9 executes the anti-deterioration process by filling the cathode flow path 22 of the fuel cell stack 20 with an inert gas, and thereafter, stops the operation of the system accessory 30 and the power generation by the fuel cell stack 20. This feature makes it possible to retard the deterioration of the fuel cell stack 20 although it takes a longer time to resume the power generation by the fuel cell stack 20 in comparison with the second idling stop process.

(5) According to the present embodiment, one of the normal power generation process and the first to third idling stop processes is selectively executed based on a state of the vehicle V and a state of the high voltage battery B. This feature makes it possible to execute one idling stop process suitable for the state of the vehicle V and the state of the high voltage battery B such that the energy efficiency and the restartability are not impaired.

(6) According to the present embodiment, the first idling stop process is executed when a charge rate of the high voltage battery B is equal to or higher than the upper limit and the vehicle V is at a temporary stop. Due to this feature, when the vehicle V resumes traveling, the output of the fuel cell system 2 can be promptly increased in response to a request of the driver, while preventing overcharge of the high voltage battery B.

(7) According to the present embodiment, the second idling stop process is executed when the charge rate of the high voltage battery B is equal to or higher, than the upper limit and the vehicle V is traveling downhill. Due to this feature, while the power generation by the fuel cell stack 20 is stopped, the system accessory 30 can be driven by means of the regenerative power outputted from the traction motor M. Thus, the present embodiment makes it possible to cover the power consumption of the system accessory 30 with the regenerative power, while preventing overcharge of the high voltage battery B.

(8) As described above, it takes a longer time to resume the power generation in the third idling stop process than in the first and second idling stop processes. To address this, according to the present embodiment, when the charge rate of the high voltage battery B is equal to or higher than the upper limit and the vehicle V is at a standstill, that is, when it can be determined that the driver does not intend to immediately resume moving the vehicle V, the third idling stop process is executed. This feature makes it possible to retard the deterioration of the fuel cell stack 20 without impairing the restartability.

Second Embodiment

Next, a power system according to a second embodiment of the present disclosure will be described with reference to the drawings. In the following description of the power system according to the second embodiment, the same components as those of the power system of the first embodiment are denoted by the same reference characters, and a detailed description of the same components will be omitted.

Figure 7:
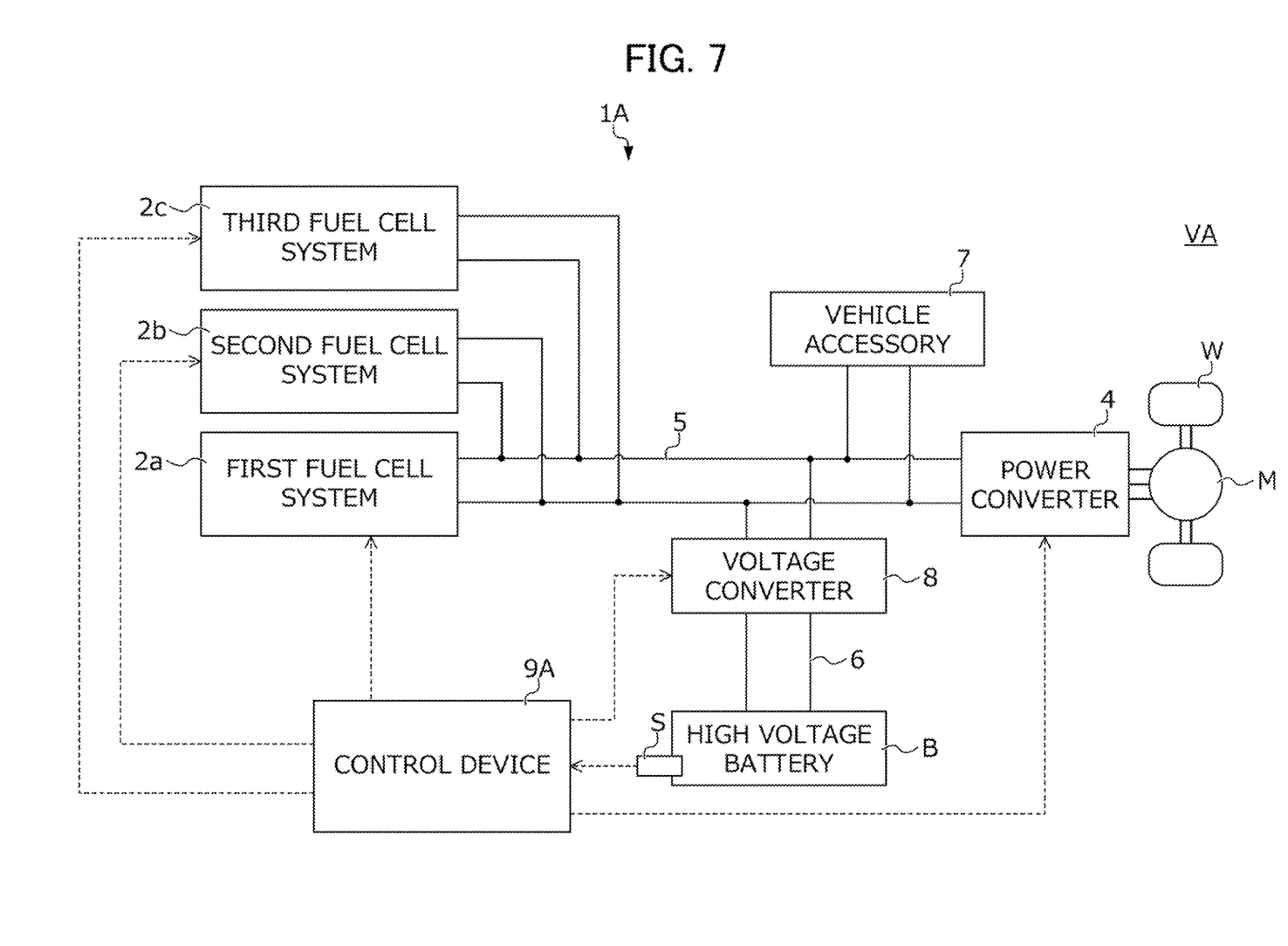
FIG. 7 is a diagram illustrating a configuration of a vehicle equipped with a power system according to a second embodiment of the present disclosure.

FIG. 7 is a diagram illustrating a configuration of a vehicle VA equipped with the power system 1A according to the present embodiment. As illustrated in FIG. 7, the power system 1A according to the present embodiment differs from the power system 1 of the first embodiment in that the power system 1A includes a plurality of (three in the example of FIG. 7) fuel cell systems 2a, 2b, and 2c and a control device 9A having a different configuration. Note that since the fuel cell systems 2a, 2b, and 2c have substantially the same specific configuration as that of the fuel cell system 2 described with reference to FIG. 2, a detailed description of the fuel cell systems 2a, 2b, and 2c will be omitted. In the following, a case in which the vehicle VA is a large vehicle, such as a truck, a bus, and a tractor, will be described. However, the present disclosure is not limited to the following case. The power system 1A may be mounted on a movable body other than a vehicle (e.g., shipping, an aircraft, a robot, etc.), or may be used as a stationary or portable power supply apparatus for supplying power to a predetermined load.

The first fuel cell system 2a, the second fuel cell system 2b, and the third fuel cell system 2c are respectively connected to a first power line 5 such that the respective outputs can be combined with each other in the first power line 5.

The control device SA selectively executes one of a normal power generation process and first, to third idling stop processes according to, for example, the same procedure as that described with reference to FIG. 3, based on a state of the vehicle V and a state of a high voltage battery B. When executing the normal power generation process, the control device 9A makes a net output of each of the plurality of fuel cell systems 2*a*, 2*b*, 2*c* greater than 0. When the first to third idling stop processes are to be executed, the control device 9A performs a procedure illustrated in FIG. 8 to select, from the plurality of fuel cell systems 2*a*, 2*b*, and 2*c*, an idling stop target the net output of which is to be made equal to or less than 0.

Figure 8:
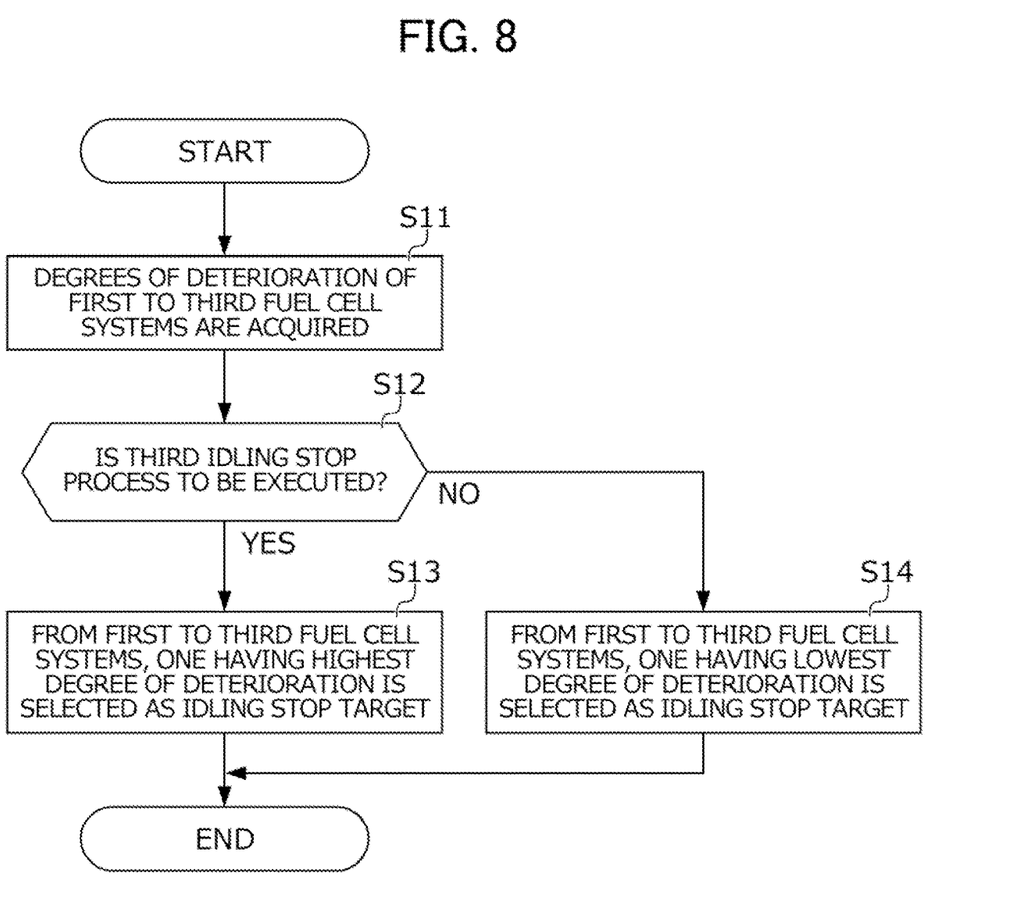
FIG. 8 is a flowchart illustrating a procedure according to which a control device selects an idling stop target.

FIG. 3 is a flowchart illustrating the procedure according to which the control device 9A selects the idling stop target. The process illustrated in FIG. 8 is executed by the control device 9A in response to a determination that the first to third idling stop processes are to be executed, the determination being made according to the process illustrated In FIG. 3.

First, in S11, the control device 9A acquires a degree of deterioration of each of the first to third fuel cell systems 2*a* to 2*c*. More specifically, the control device 9A calculates the degree of deterioration based on parameters correlated with the deterioration of the fuel cell systems, such as total power generation hours of each of the first to third fuel cell systems 2*a* to 2*c*, power generation hours in each power generation state, the number of starts, and the number of stops.

Next, in S12, the control device 9A determines whether the idling stop process to be executed is the third idling stop process. If the determination in S12 is YES, the control device 9A selects, as the idling stop target, one fuel system that has the highest degree of the degrees of deterioration acquired in S11 from the first to third fuel cell systems 2*a* to 2*c*, and executes the third idling stop process on the idling stop target (see S13).

If the determination in S12 is NO, that is, when the idling stop process to be executed is the first or second idling stop process, the control device 9A selects, as the idling stop target, one fuel system that has the lowest degree of the degrees of; deterioration acquired in S11 from the first to third fuel cell systems 2*a* to 2*c*, and executes the first or second idling stop process on the idling stop target (see S14).

As described above, the control device 9A selects the idling stop target the net output of which is to be made 0 or less from the plurality of fuel cell systems 2*a* to 2*c*, based on the degree of deterioration of each of the plurality of fuel cell systems 2*a* to 2*c*.

The power system 1A of the present embodiment provides the following advantages.

(9) In the present embodiment, the idling stop target the net output of which is to be made equal to or less than 0 is selected from the plurality of fuel cell systems 2*a* to 2*c*, based on the degree of deterioration of each of the plurality of fuel cell systems 2*a* to 2*c*. This feature renders it possible to make the degrees of deterioration of the fuel cell systems 2*a* to 2*c* approximately uniform.

(10) As described with reference to FIG. 5, the first and second idling stop processes have more effect on the deterioration of the fuel cell system than the third idling stop process. In view of this, according to the present embodiment, when the first or second idling stop process is to be executed, one of the plurality of fuel cell systems 2*a* to 2*c* that has the lowest degree of deterioration is selected as the idling stop target. This feature renders it possible to make the degrees of deterioration of the fuel cell systems 2*a* to 2*c* approximately uniform.

(11) As described with reference to FIG. 5, the third idling stop process has less effect on the deterioration of the fuel cell system than the first and second idling stop processes. In view of this, according to the present embodiment, when the third idling stop process is to be executed, one of the plurality of fuel cell systems 2*a* to 2*c* that has the highest degree of deterioration is selected as the idling stop target. This feature renders it possible to make the degrees of deterioration of the fuel cell systems 2*a* to 2*c* approximately uniform.

In the foregoing, embodiments of the present disclosure have been described. It should be noted that the above-described embodiments are not intended to limit the present disclosure. Appropriate modifications may be made to configurations of specifics without deviating from the spirit of the present disclosure.

What is claimed is:

1. A power system comprising:
   a fuel cell stack that generates power by way of an electrochemical reaction between a fuel gas and an oxidant gas;
   a system accessory that supplies the fuel gas and the oxidant gas by consuming power;
   a battery that stores power outputted from the fuel cell stack;
   a load that consumes power outputted from the fuel cell stack or power outputted from the battery; and
   a control device that controls a fuel cell system including the fuel cell stack and the system accessory,
   wherein the control device executes, based on a state of the power system and a state of the battery, one of following processes:
   a normal power generation process during which the control device causes the fuel cell stack to generate power, and makes a net output greater than 0, the net output being output power of the fuel cell system; and
   an idling stop process during which the control device makes the net output equal to 0 by stopping both the operation of the system accessory and the power generation by the fuel cell stack, and
   wherein the control device executes the idling stop process while a shift position of a vehicle is in a parking position or while a vehicle speed is 0 and a parking brake of the vehicle is in operation.

2. The power system according to claim 1,
   wherein during the idling stop process, the control device executes an anti-deterioration process by filling an oxidant gas flow path of the fuel cell stack with an inert gas, and thereafter, stops the operation of the system accessory and the power generation by the fuel cell stack.

3. The power system according to claim 2,
   wherein the load includes a traction motor for causing the vehicle to travel, and
   wherein the control device selectively executes one of the normal power generation process and the idling stop processes, based on a state of the vehicle and a state of the battery.

4. The power system according to claim 3,
   wherein the control device executes the idling stop process when the charge rate of the battery is equal to or higher than the predetermined value and the vehicle is at a standstill.

5. The power system according to claim 4,
wherein the power system comprises a plurality of fuel cell systems, and
wherein the control device selects, at least one of the plurality of fuel cell systems as an idling stop target based on a degree of deterioration of each of the plurality of fuel cell systems, and reduces the net output of the idling stop target.

6. The power system according to claim 5,
wherein when the idling stop process is to be executed, the control device selects, as the idling stop target, one fuel system that has the highest degree of deterioration from the plurality of fuel cell systems.

7. The power system according to claim 1,
wherein the load includes a traction motor for causing the vehicle, and
wherein the control device selectively executes one of the normal power generation process and the idling stop processes, based on a state of the vehicle and a state of the battery.

8. The power system according to claim 7,
wherein the control device executes the idling stop process when a charge rate of the battery is equal to or higher than a predetermined value and the vehicle is at a standstill.

9. The power system according to claim 1,
wherein the power system comprises a plurality of fuel cell systems, and
wherein the control device selects from at least one of the plurality of fuel cell systems as an idling stop target based on a degree of deterioration of each of the plurality of fuel cell systems, and reduces the net output of the idling stop target.

10. The power system according to claim 9,
wherein when the idling stop process is to be executed, the control device selects, as the idling stop target, one fuel system that has the highest degree of deterioration from the plurality of fuel cell systems.

\* \* \* \* \*